United States Patent Office 2,876,218
Patented Mar. 3, 1959

2,876,218
AMINATION OF ALPHA-HALO-EPSILON-CAPROLACTAMS

William C. Francis, Pittsburg, Kans., and Thomas R. Hopkins, Joplin, Mo., assignors to Spencer Chemical Company, a corporation of Missouri No Drawing. Application March 30, 1956
Serial No. 574,967

15 Claims. (Cl. 260—239.3)

This invention relates to lysine. More particularly, this invention is concerned with a novel process of producing lysine from alpha-halo-epsilon-caprolactams.

According to the present invention it has now been discovered that alpha-halo-epsilon-caprolactams may be reacted with ammonia to form alpha-amino-epsilon-caprolactam which may then be hydrolyzed to lysine. This process may be represented as follows:

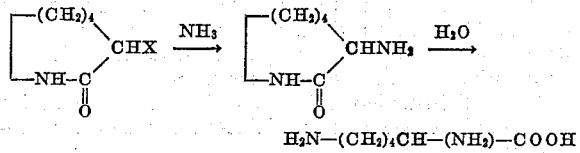

$$H_2N-(CH_2)_4CH-(NH_2)-COOH$$

wherein X is a halogen, particularly chlorine, bromine or iodine.

The alpha-bromo and alpha-iodo-epsilon-caprolactams used as starting materials in this invention may be produced by the procedures disclosed in application Serial No. 574,969, filed March 30, 1956, now U. S. Patent No. 2,832,770.

The first step of the process is achieved by contacting an alpha-halo-epsilon-caprolactam with ammonia, preferably under liquid reaction conditions. The liquid reaction medium may comprise an inert organic solvent such as a lower alcohol or other polar solvent but preferably is achieved by the use of liquid ammonia in excess which fills the dual function of being a reactant as well as reaction medium.

Although alpha-halo-epsilon-caprolactam may be contacted with one mole-equivalent of ammonia to form the desired product, far superior results are achieved when substantially significant molar excesses of ammonia are employed. The use of excess ammonia suppresses intramolecular rearrangement and the consequential formation of undesirable piperidine-2-carboxamide. By suppressing this rearrangement, higher yields of alpha-amino-epsilon-caprolactam are achieved. Molar excesses of ammonia may be employed over a wide range; satisfactory results are achieved at molar-equivalent ratios of 60:1 to an upper limit which is bounded only by practical considerations. The lower limit is not narrowly critical although generally it is best to use a ratio higher than 40:1. Liquid ammonia may be readily recovered after the reaction is terminated so that no significant losses are encountered to deter the use of such molar excesses. The use of anhydrous conditions is also favored over aqueous ammonia because the stated undesirable rearrangement is thereby further suppressed.

The reaction proceeds most effectively at elevated temperatures such as from 50–100° C. at autogenous pressures. Optimum temperatures as well as pressures will vary with the particular alpha-halo-epsilon-caprolactam employed but will be easily determined for each by those skilled in the art. Reaction times will also vary; however, 6–12 hours is often adequate although reaction times of 1–2 days may also be used without deleterious effect.

The alpha-amino-epsilon-caprolactam prepared above may be isolated from the reaction mixture by conventional means after the amination reaction is terminated. Generally, however, it is customary to flash off the excess $NH_3$ and thereafter subject the remaining reaction mixture to a suitable hydrolytic procedure to directly produce lysine. Strong acids or bases such as the mineral acids and alkali metal hydroxides in aqueous solutions may be conveniently employed for the hydrolysis.

The hydrolysis is effected generally by heating at reflux temperature, at which temperature 1–2 hours may suffice for the hydrolysis.

The hydrolysis will result in acidic or basic salts of lysine according to the hydrolyzing agent used. Because of the two amino groups in lysine, either mono- or diacid addition salts may be formed, although the di-salt is generally formed because of the excess acid ordinarily used for the hydrolysis. By treating such di-salts with an organic base, such as aniline or pyridine, one of the acid groups may be removed and the monoacid addition salt of lysine obtained. Since lysine has a carboxylic group, hydrolysis with inorganic bases yields metal salts of lysine. The free amino acid may be obtained from both the acid addition salts and the metal salts of lysine by careful treatment of such salts with bases and acids respectively.

The following examples are intended for purposes of illustration and are not meant to limit the scope of this invention as modifications will be obvious to those skilled in the art.

Example 1

A mixture of 5 g. (0.034 mole) of alpha-chloro-epsilon-caprolactam and 75 ml. (approximately 3.2 moles) of liquid ammonia was heated in a rocking autoclave at 65° C. for 24 hours. The excess ammonia was vented from the reactor, and the syrupy residue was dissolved in 80 ml. of methanol. Gaseous hydrogen chloride was passed through the methanol solution until it was distinctly acidic. The mixture was then allowed to stand in a refrigerator for several days, and the resulting precipitate was removed by filtration. The melting point of this material was 270°–275° C. and showed no mixed melting point depression with an authentic sample of alpha-amino-epsilon-caprolactam hydrochloride. The infrared spectrum of this product was identical to that of the authentic sample. A small additional amount of product was obtained by adding ether to the methanol filtrate. Infrared anaylsis showed this material to consist of about 70% alpha-amino-epsilon-caprolactam hydrochloride, 20% piperidine-2 carboxylic acid hydrochloride, and 10% unidentified compound.

Example 2

A mixture of 18.2 gms. (0.123 mole) of alpha-chloro-epsilon-caprolactam and about 11.7 moles of liquid ammonia was heated in a rocking autoclave at 60° C. for 37 hrs. After venting the excess ammonia the residue was taken up in methanol, acidified with gaseous HCl and the product fractionally precipitated by addition of ether to the methanol filtrate to obtain 3.9 gms. of nearly pure alpha-amino-epsilon-caprolactam hydrochloride; this material showed no depression of melting point when mixed with an authentic sample of alpha-amino-epsilon-caprolactam.

Example 3

A similar run with a 95:1 molar ratio of ammonia: alpha-chloro-epsilon-caprolactam was conducted at 75° C. for 26½ hours. The reaction product was washed from the reactor with acetone and the acetone-insoluble product isolated by filtration. The acetone filtrate was acidified with anhydrous HCl, precipitating additional product, which was removed by filtration. The acidic acetone filtrate was distilled to dryness to recover unreacted alpha-chloro-epsilon-caprolactam. The recovered alpha-chloro-epsilon-caprolactam was purified by recrystallization from ligroin. Analysis of the components of the product mixture by infrared showed the presence of alpha-amino-epsilon-caprolactam hydrochloride.

*Example 4*

The mixture of 6.5 gms. (0.034 mole) of alpha-bromo-epsilon-caprolactam and 75 mls. (about 3.23 moles) of liquid ammonia (1:95 ratio of lactam:$NH_3$) was heated at 60° C. for 26½ hours. After venting off the excess ammonia, the residue was taken up in methanol, concentrated under vacuum and acidified with gaseous HCl. Fractional precipitation by addition of ether resulted in the isolation of 0.7 gm. of alpha-amino-epsilon-caprolactam hydrochloride, M. P. 261–270° C.

*Example 5*

A 200 ml. stainless steel autoclave was charged with 4.0 gms. (0.027 mole) of alpha-chloro-epsilon-caprolactam and approximately 3.23 moles of anhydrous ammonia (1:120 ratio) and heated at 85° C. for 64 hours. The reaction mixture containing alpha-amino-epsilon-caprolactam was vented and excess $NH_3$ removed. The syrupy residue was refluxed with an excess of aqueous HCl to effect ring scission and thereafter vacuum distilled to remove HCl. The residue, containing lysine dihydrochloride and ammonium chloride, was taken up in alchol and filtered to remove the inorganic salt. The dihydrochloride was reacted with pyridine to yield 1.4 gms. (0.008 mole) of lysine monohydrochloride, M. P. 253–255° C.

*Example 6*

The procedure of Example 5 was followed using 5.0 gms. (0.0339 mole) of alpha-chloro-epsilon-caprolactam and 3.24 moles of ammonia (1:95.5 ratio) at 60° C. for 37 hours and gave 1.61 gms. (0.009 mole) of lysine monohydrochloride.

*Example 7*

18.2 grams (0.123 mole) of alpha-chloro-epsilon-caprolactam and 11.7 moles of ammonia (1:95 ratio) was reacted at 60° C. for 37 hours as in Example 5. After venting the excess $NH_3$ from the alpha-amino-epsilon-caprolactam it was taken up in methanol, acidified with gaseous HCl, and filtered to remove ammonium chloride. The acidified filtrate was treated with ether to fractionally crystallize alpha-amino-caprolactam hydrochloride from piperidine-2-carboxamide hydrochloride. The aminolactam was hydrolyzed and thereafter treated with pyridine to give 8.8 gms. (0.048 mole) of lysine monohydrochloride.

*Example 8*

A 200 ml. stainless steel autoclave charged with 6.2 gms. (0.0322 mole) of alpha-bromo-epsilon-caprolactam and 75 mls. (about 3.2 moles) of liquid ammonia was heated at 65° C. for 64 hours. The excess ammonia was vented from the alpha-amino-epsilon-caprolactam and the syrupy residue refluxed for 5½ hours with excess aqueous hydrochloric acid. The hydrolysate was evaporated to dryness under reduced pressure, extracted with boiling methanol and filtered to remove ammonium bromide. A semi-crystalline precipitate, which separated from the cool filtrate by addition of 90 mls. of ether, was treated with 2.6 gms. of pyridine to produce 3.5 gms. of crude lysine monohydrochloride; M. P. 220–240° C. This was recrystallized from $H_2O$-alcohol to give a product melting at 251–253° C.

*Example 9*

A mixture of 6.2 gms. (0.0259 mole) of alpha-iodo-epsilon-caprolactam and 57 mls. (2.46 moles) of liquid ammonia was heated at 55° C. for 24 hours under autogenous pressure to form alpha-amino-epsilon-caprolactam which was treated as in Example 8 to yield 0.7 gm. of lysine monohydrochloride.

*Example 10*

A 750 ml. stainless steel autoclave was charged with 26.8 gms. (0.182 mole) of alpha-chloro-epsilon-caprolactam and 233 ml. (approximately 10 moles) of liquid ammonia.

The reactor was then heated on a rocking shaker at 60° C. for 26.5 hours.

Excess ammonia was vented and the crystalline residue washed from the reactor with acetone. Filtration yielded a crop of alpha-amino-epsilon-caprolactam hydrochloride. The acetone filtrate was concentrated to about half the original volume and made slightly acidic with gaseous hydrogen chloride. Upon standing, further product precipitated and was removed by filtration. The acetone filtrate was distilled to dryness, and the residue was washed with ligroin to yield 22.4 gms. of unreacted alpha-chloro-epsilon-caprolactam, a recovery of 83.6%.

The crops of pure alpha-amino-epsilon-caprolactam hydrochloride initially isolated from the acetone solution weighed 1.74 gms., M. P. 276–280° C. dec. The impure crops were found, on the basis of infrared analysis, to contain 0.7 gm. of alpha-amino-epsilon-caprolactam hydrochloride and 0.6 gm. of piperidine-2-carboxamide hydrochloride. These amounts correspond to 49.8% net yield of alpha-amino-epsilon-caprolactam hydrochloride and 12.3% net yield of piperidine-2-carboxamide hydrochloride.

*Example 11*

Into each of two 200 ml. stainless steel autoclaves was charged 10 gms. (0.068 mole) of alpha-chloro-epsilon-caprolactam and 70 ml. (approximately 2.94 moles) of liquid ammonia. Both reactors were heated on a rocking shaker at 65° C. for 72 hours.

Excess ammonia was vented and the crystalline residue washed from the reactors with a total of 200 ml. of methanol. The methanol solution was concentrated under vacuum over a steam bath, and the concentrate acidified with gaseous hydrogen chloride.

To the acidic solution was added slowly 450 ml. of ether in portions of 30 to 100 ml. and the successive crops of product collected by filtration. In this manner there was obtained a total of 1.8 gms. of alpha-amino-epsilon-caprolactam hydrochloride, M. P. 278–281° C.

The remaining crops of less pure material were combined and recrystallized in the same manner from methanol and ether and yielded 5.0 gms. of piperidine-2-carboxamide hydrochloride, M. P. 249–251° C. (no mixed melting point depression with authentic sample).

The mother liquor was distilled to dryness, and the residue (a mixture of alpha-amino-epsilon-caprolactam and piperidine-2-carboxamide hydrochloride) hydrolyzed by refluxing with hydrochloric acid. The hydrolysis solution was distilled to dryness and the residue extracted with hot absolute alcohol. Addition of ether precipitated crude lysine dihydrochloride, which upon treatment with pyridine in alcohol solution, yielded 3.5 gms. of lysine monohydrochloride, M. P. 261–263° C. From the pyridine-alcohol filtrate there was recovered 1.7 gms. of piperidine-2-carboxylic acid, M. P. 258–262° C. (no mixed melting point depression with an authentic sample). These products correspond to the following conversions: piperidine-2-carboxamide, 22.3%; piperidine-2-carboxylic acid, 16.9%; alpha-amino-epsilon-caprolactam, 8.0%; lysine monohydrochloride, 14.1%.

Various changes and modifications of the invention can be made and, to the extent that such variations incorporate the spirit of this invention, they are intended to be included within the scope of the appended claims.

What is claimed is:

1. The process which comprises reacting an alphahalo-epsilon-caprolactam with ammonia under liquid reaction conditions to produce alpha-amino-epsilon-caprolactam.

2. The process which comprises reacting alpha-halo-epsilon-caprolactam with excess liquid ammonia to produce alpha-amino-epsilon-caprolactam.

3. The process which comprises reacting alpha-halo-epislon-caprolactam with excess liquid ammonia at a temperature of 50–100° C. to produce alpha-amino-epsilon-caprolactam.

4. The process which comprises reacting alpha-halo-epsilon-caprolactam with at least 60 mole-equivalents of liquid ammonia at a temperature of 50–100° C. to produce alpha-amino-epsilon-caprolactam.

5. The process which comprises reacting alpha-halo-epsilon-caprolactam with at least 40 mole-equivalents of liquid ammonia at a temperature of 50–100° C. to produce alpha-amino-epsilon-caprolactam.

6. The process of claim 1 in which the reaction is run at a temperature above room temperature and at least autogenous pressure.

7. The process which comprises contacting alpha-halo-epsilon-caprolactam with excess liquid ammonia above room temperature and at least outogenous pressure to produce alpha-amino-epsilon-caprolactam, removing the excess ammonia and hydrolyzing the alpha-amino-epsilon-caprolactam to form lysine.

8. The process of claim 7 in which the reaction temperature is 50–100° C.

9. The process of claim 1 in which alpha-chloro-epsilon-caprolactam is the alpha-halo-epsilon-caprolactam employed.

10. The process of claim 1 in which alpha-bromo-epsilon-caprolactam is the alpha-halo-epsilon-caprolactam employed.

11. The process of claim 1 in which alpha-iodo-epsilon-caprolactam is the alpha-halo-epsilon-caprolactam employed.

12. The process which comprises reacting alpha-chloro-epsilon-caprolactam with at least 40 mole-equivalents of anhydrous liquid ammonia at 50–100° C. and at least autogenous pressure to produce alpha-amino-epsilon-caprolactam.

13. The process which comprises reacting alpha-bromo-epsilon-caprolactam with at least 40 mole-equivalents of anhydrous liquid ammonia at 50–100° C. and at least autogenous pressure to produce alpha-amino-epsilon-caprolactam.

14. The process which comprises reacting a mole of alpha-iodo-epsilon-caprolactam with at least 40 mole-equivalents of anhydrous liquid ammonia at 50–100° C. and at least autogenous pressure to produce alpha-amino-epsilon-caprolactam.

15. The process of claim 1 in which the reaction is run under essentially anhydrous conditions.

References Cited in the file of this patent

Desha: Org. Chem., page 235 (1952), McGraw-Hill Book Co., Inc., New York.

UNITED STATES PATENT OFFICE
CERTIFICATE OF CORRECTION

Patent No. 2,876,218                                                                     March 3, 1959

William C. Francis et al.

It is hereby certified that error appears in the printed specification of the above numbered patent requiring correction and that the said Letters Patent should read as corrected below.

Column 2, line 48, for "anaylsis" read -- analysis --; column 3, line 31, for "alchol" read -- alcohol --; column 5, line 8, for "epislon-caprolactam" read -- epsilon-caprolactam --; same column 5, line 24, claim 7, for "outogenous" read -- autogenous --.

Signed and sealed this 11th day of August 1959.

(SEAL)
Attest:

KARL H. AXLINE
Attesting Officer

ROBERT C. WATSON
                                                                 Commissioner of Patents